United States Patent
Iwaki

(10) Patent No.: US 11,790,588 B2
(45) Date of Patent: Oct. 17, 2023

(54) DISPLAY CONTROL DEVICE, DISPLAY CONTROL METHOD, AND DISPLAY SYSTEM

(71) Applicant: DWANGO Co., Ltd., Tokyo (JP)

(72) Inventor: Shinnosuke Iwaki, Tokyo (JP)

(73) Assignee: DWANGO Co., Ltd., Tokyo (JP)

( * ) Notice: Subject to any disclaimer, the term of this patent is extended or adjusted under 35 U.S.C. 154(b) by 0 days.

(21) Appl. No.: 17/626,868

(22) PCT Filed: Oct. 12, 2020

(86) PCT No.: PCT/JP2020/038434
§ 371 (c)(1),
(2) Date: Jan. 13, 2022

(87) PCT Pub. No.: WO2021/079766
PCT Pub. Date: Apr. 29, 2021

(65) Prior Publication Data
US 2022/0262058 A1    Aug. 18, 2022

(30) Foreign Application Priority Data

Oct. 25, 2019    (JP) ................................ 2019-194266

(51) Int. Cl.
*G06T 13/40*    (2011.01)
*G06T 15/20*    (2011.01)
(Continued)

(52) U.S. Cl.
CPC .......... *G06T 13/40* (2013.01); *G02B 27/0101* (2013.01); *G02B 27/017* (2013.01);
(Continued)

(58) Field of Classification Search
CPC ............... G06F 2111/18; G06F 3/0481; G06F 3/04817; G06F 9/4443; G06F 3/04847;
(Continued)

(56) References Cited

U.S. PATENT DOCUMENTS

2022/0262058 A1*    8/2022    Iwaki ................. G02B 27/0172

FOREIGN PATENT DOCUMENTS

| JP | 2013-533537 A | 8/2013 |
| JP | 2018-10487 A | 1/2018 |
| JP | 2018-97517 A | 6/2018 |
| JP | 2018-175849 A | 11/2018 |

OTHER PUBLICATIONS

International Search Report dated Nov. 10, 2020 in corresponding application No. PCT/JP2020/038434; 6 pgs.
(Continued)

*Primary Examiner* — Todd Buttram
(74) *Attorney, Agent, or Firm* — Maier & Maier, PLLC

(57) ABSTRACT

A terminal is a display control device for displaying a virtual space including an avatar that is operated by a user wearing a head-mounted display, the terminal being provided with: an avatar control unit which generates control data of the avatar corresponding to the movement of the user; a computation unit which, when the avatar and an object have collided with each other, computes physical behaviors of the avatar and the object that correspond to the collision; a VR space management unit which applies the result of the computation made by the computation unit to the virtual space; and a rendering unit which renders, as an image to be supplied to the head-mounted display, the avatar the behavior of which corresponding to the collision is kept within a predetermined range.

6 Claims, 8 Drawing Sheets

(51) Int. Cl.
*G06T 19/00* (2011.01)
*G06F 3/01* (2006.01)
*G02B 27/01* (2006.01)

(52) U.S. Cl.
CPC ............ *G06F 3/011* (2013.01); *G06T 15/205* (2013.01); *G06T 19/006* (2013.01); *G02B 2027/014* (2013.01)

(58) Field of Classification Search
CPC .............. G06F 11/3664; G06F 3/0304; G06F 3/011–015; G06V 20/20; G06T 19/00; G06T 17/00; G06T 7/00; G06T 19/006; G06T 2215/16; H04N 5/272; H04N 2201/3245; A63F 13/10; G02B 27/017
See application file for complete search history.

(56) References Cited

OTHER PUBLICATIONS

Sugimori, Ken et al., non-official translation "VTuber avatar that can freely change the hardness of the body when Interacting with an object", Interaction Papers 2019, Feb. 27, 2019, pp. 843-845, particularly, p. 844, machine translation of Abstract is attached, 8 pgs.
Japanese Office Action dated Feb. 12, 2020, in corresponding application No. 2019-194266; 8 pgs.
Japanese Office Action dated Jun. 23, 2020, in corresponding application No. 2019-194266; 8 pgs.

\* cited by examiner

DISPLAY CONTROL DEVICE, DISPLAY CONTROL METHOD, AND DISPLAY SYSTEM

FIELD

The present invention relates to a display control device, a display control method, and a display system.

BACKGROUND

In recent years, services that allow users to operate avatars to distribute programs in virtual reality (VR) space and to communicate with each other via avatars have become widespread.

In a case where an object collides with an avatar operated by a user, for example, in a case where an object thrown into a VR space by a viewer collides with an avatar, or avatars collide with each other, when the avatar does not react according to the collision timing of the object, the viewer cannot really feel that the object collides with the avatar.

Non-Patent Document 1 proposes a technology for automatically generating a reaction motion of an avatar by a physics engine when the avatar and an object collide with each other. In Non-Patent Document 1, since a reaction according to the collision of the object is automatically performed, the user does not need to operate in accordance with the collision timing of the object. In addition, when the avatar comes into contact with another avatar or object, an arm of the avatar does not penetrate the object, and thus it is possible to deliver a video that allows a more realistic feeling.

NON-PATENT DOCUMENT

Non-Patent Document 1: Ken Sugimori and four others, "Acting support! VTuber avatar that moves freely when a gift is won", CEDEC2019, General Corporation, Computer Entertainment Supplier's Association, Sep. 4, 2019

SUMMARY

However, in Non-Patent Document 1, there is a problem that when the avatar and the object collide, the avatar automatically reacts regardless of the intention of the user who operates the avatar, so that a state of the avatar thought by the user does not match a state of the avatar seen by the user, and the user feeds uncomfortable.

The invention has been made in view of the above description, and an object of the invention is to make the collision between the avatar and the object more realistic and to make the user who operates the avatar hardly feel uncomfortable.

A display control device of an aspect of the invention is a display control device for displaying a virtual space including an avatar operated by a user wearing a head-mounted display, including an avatar control unit for generating control data of the avatar according to movement of the user, a computation unit for calculating physical behaviors of the avatar and an object according to a collision when the avatar and the object collide with each other, a virtual space management unit for applying a calculation result of the computation unit to the virtual space, and a rendering unit for rendering the avatar whose behavior in response to a collision is suppressed within a predetermined range as a video supplied to the head-mounted display when a posture of the avatar to which the calculation result is applied and a posture of the avatar based on an operation of the user diverge from each other by a predetermined value or more.

According to the invention, it is possible to make the collision between the avatar and the object more realistic and to make the user who operates the avatar hardly feel uncomfortable.

DETAILED DESCRIPTION

First Embodiment

Hereinafter, a display system including a display control terminal of a first embodiment will be described with reference to the drawings.

The display system including the display control terminal of the first embodiment is a system in which respective users operate avatars in a virtual space, chat in the virtual space via the avatars, and can communicate with each other on a network.

Figure 1:
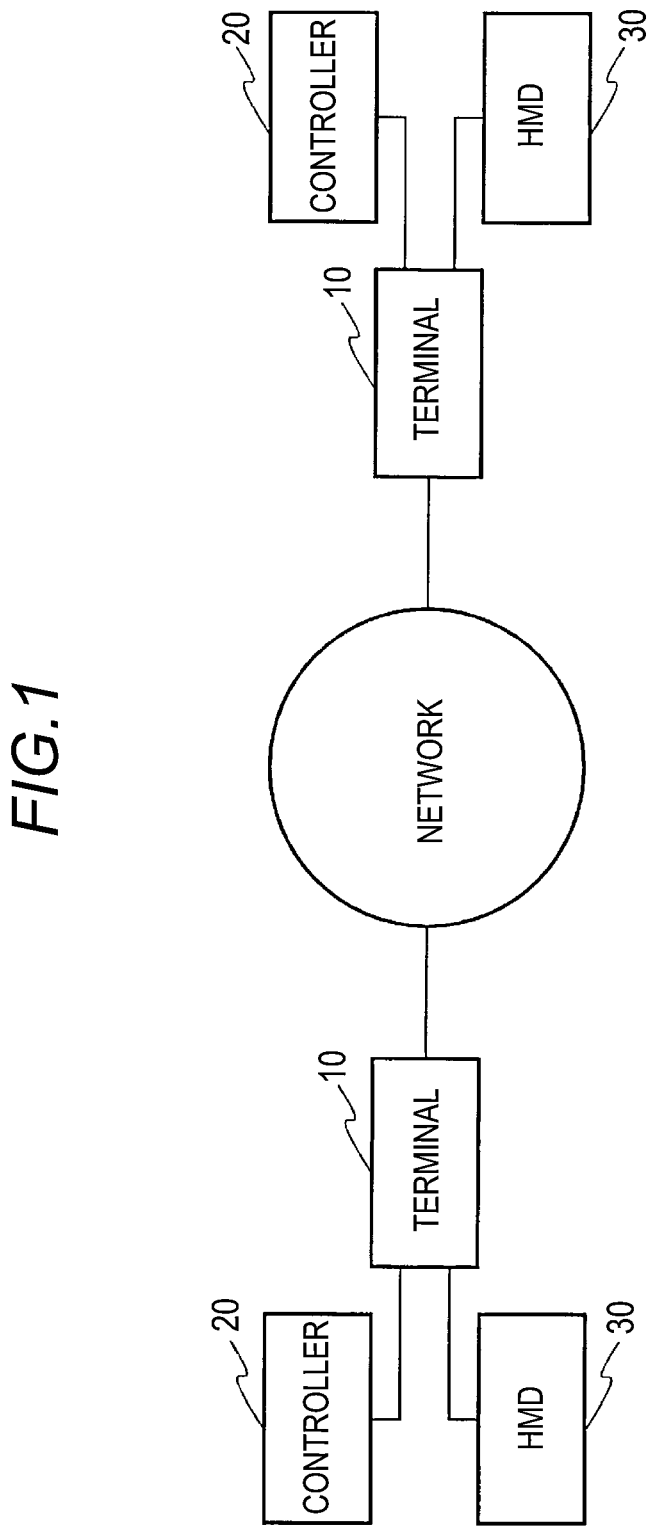
FIG. 1 is a diagram illustrating a configuration example of a display system including a display control terminal of a first embodiment.

The display system of FIG. 1 includes a plurality of terminals 10 communicably connected via the network. Each of the terminals 10 is a display control terminal of the first embodiment. Even though only two terminals 10 are illustrated in FIG. 1, three or more users may participate in a chat, and the number of terminals 10 is arbitrary.

A controller 20 and a head-mounted display (HMD) 30 are connected to each terminal 10. The user can operate the avatar by the controller 20, and can see the virtual space from a viewpoint of the avatar by wearing the HMD 30. The HMD 30 includes a microphone and a speaker. Voice of the user collected by the microphone is transmitted to the terminal 10 of another user. Further, voice of another user received from the terminal 10 of another user is output from the speaker.

The avatars operated by each user exist in the same virtual space. Data in the virtual space may be synchronized between the terminals 10, or any terminal 10 may manage the data in the virtual space.

Figure 2:
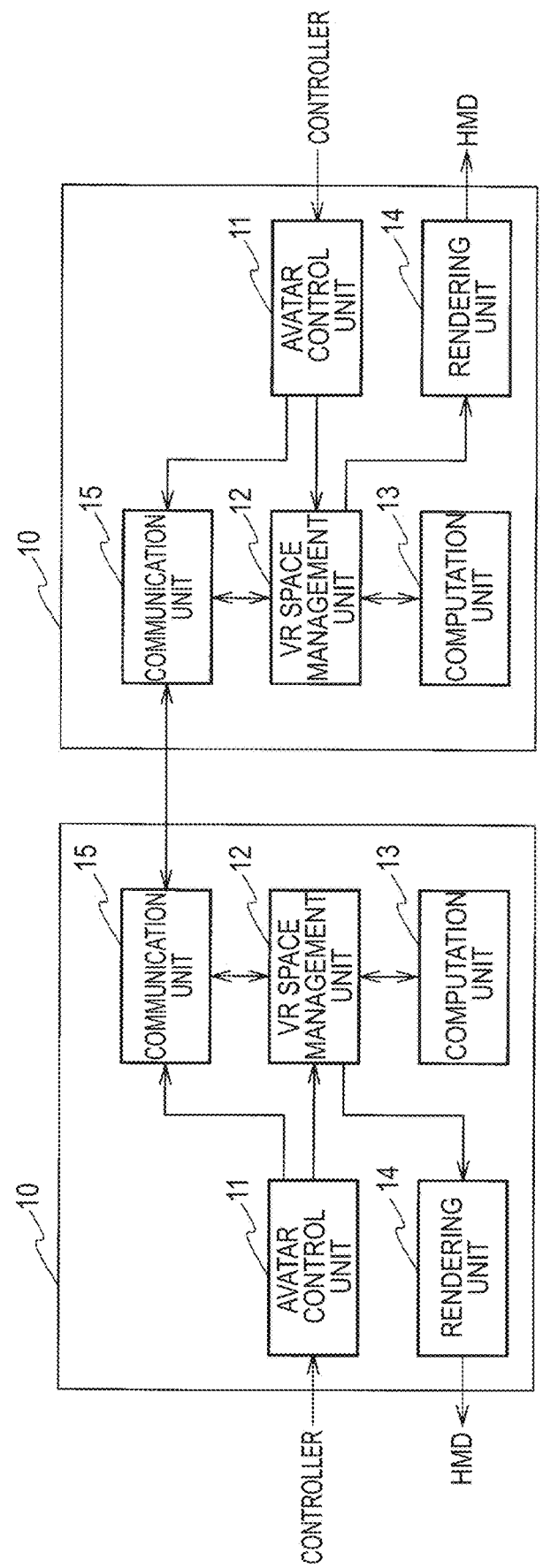
FIG. 2 is a functional block diagram illustrating a configuration example of the display control terminal of the first embodiment.

A configuration of the terminal 10 will be described with reference to FIG. 2. FIG. 2 illustrates the terminal 10 used by each user. The terminal 10 includes an avatar control unit 11, a VR space management unit 12, a computation unit 13, a rendering unit 14, and a communication unit 15. For the terminal 10, for example, it is possible to use a general-purpose computer system including a central processing unit (CPU), a memory, a storage space, a communication device, and an input/output device. In this computer system, each part of the terminal is implemented by the CPU executing a predetermined program loaded on the memory. This program can be recorded on a computer-readable recording medium such as a magnetic disk, an optical disc, or a semiconductor memory, or can be distributed via the network.

The avatar control unit 11 receives a posture, a position, and operation information of the user from a device such as the controller 20, and generates control data for controlling the posture and movement of the avatar of the user. The control data is motion data obtained by motion-capturing the movement of the user. Hereinafter, when the avatar operated by the user is distinguished from an avatar operated by another user, the avatar of the user may be referred to as a "user avatar" and the avatar of another user may be referred to as "another user avatar".

The VR space management unit 12 manages data of the object existing in the virtual space. The data of the object includes model data and position data of the object. An avatar is one of objects existing in the virtual space. Data related to the avatar includes, for example, model data and control data. The data in the virtual space is acquired by each terminal 10 in advance. For example, each terminal 10 may acquire data in the virtual space from a data server (not illustrated), or may acquire data from another terminal 10.

The VR space management unit 12 applies the control data generated by the avatar control unit 11 to the user avatar to update the posture and position of the user avatar, and applies the control data received from the terminal 10 of another user to another user avatar. Further, when there is an object that moves in the virtual space, the VR space management unit 12 updates the posture and position of the object according to the movement. The data in the virtual space is managed synchronously between the terminals 10, and the virtual space managed by each terminal 10 is the same virtual space. Any terminal 10 may manage the virtual space, or a server (not illustrated) may manage the virtual space. When the virtual space is managed by a specific device, each terminal 10 acquires the data of the virtual space from the device.

When objects (including avatars) collide with each other in the virtual space, the computation unit 13 calculates a physical behavior of each object in response to the collision. A well-known physics engine can be used for the computation unit 13.

The VR space management unit 12 updates the posture and position of each object based on a calculation result. For the user avatar, the VR space management unit 12 manages posture and position information of the user avatar in a state where the calculation result is not applied in addition to posture and position information of the user avatar after applying the calculation result. Alternatively, the VR space management unit 12 may manage posture and position information of the user avatar in a state where a calculation result calculated by changing a parameter is applied, or manage posture and position information of the user avatar in a state where a calculation result is applied by changing a degree of application.

The rendering unit 14 renders the virtual space from a viewpoint of the user avatar, and supplies the rendered video to the HMD 30. At this time, the rendering unit 14 renders the user avatar by replacing the user avatar with posture and position information of the user avatar managed separately so that a reaction motion of the user avatar is suppressed within a predetermined range. The predetermined range is a range within which the user does not feel uncomfortable. For example, whether or not the reaction motion is within the predetermined range can be determined based on a degree of divergence between a posture due to the reaction motion of the user avatar and a posture due to an operation of the user and a length of the reaction motion.

As a method of suppressing the reaction motion of the user avatar within the predetermined range in the video supplied to the HMD 30, the rendering unit 14 renders the user avatar in a state where the calculation result is not applied.

Alternatively, the computation unit 13 may calculate a behavior of the user avatar when a parameter such as the weight of the object colliding with the user avatar is changed as a calculation result applied to the user avatar by the rendering unit 14, and the rendering unit 14 may render the user avatar to which the calculation result having the changed parameter is applied. By treating the object that collides with the user avatar as a light object, the reaction motion of the user avatar is suppressed, and thus the user hardly feels uncomfortable.

Alternatively, the rendering unit 14 may render the user avatar to which the calculation result is applied by changing a degree of application. For example, in a case where a heavy object collides with the user avatar, the user avatar staggers greatly when the calculation result of the computation unit 13 is applied. In this case, when rendering the user avatar, the rendering unit 14 suppresses the degree of application of the calculation result and applies the calculation result to the user avatar so that the reaction motion of the user avatar becomes a small reaction motion not causing the user to feel uncomfortable.

In any case, a person other than the user sees the user avatar that reacts greatly by a normal calculation result of the computation unit 13 applied thereto. In the video supplied to the HMD 30, the reaction motion of the user avatar by the calculation result of the computation unit 13 is replaced and rendered, so that a reaction motion of the user avatar seen by others is different from a reaction motion of the user avatar seen or felt by the user.

Note that when the user avatar performs reaction motion more than a predetermined range due to object collision, the calculation result may not be applied to the user avatar, the degree of application of the calculation result may be suppressed, or the calculation result calculated by changing the parameter may be applied. That is, when the posture of the user avatar to which the calculation result is applied and the posture of the user avatar based on the operation of the user diverge from each other by a predetermined value or more, the rendering unit 14 may vary the calculation result applied to the user avatar.

The communication unit 15 transmits and receives control data of the user avatar and voice data of the user to and from the terminal 10 of another user. More specifically, the communication unit 15 transmits the control data of the user avatar generated by the avatar control unit 11 to the terminal 10 of another user, and receives control data of another user avatar from the terminal 10 of another user. Further, the communication unit 15 transmits voice data of the user collected by the microphone of the HMD 30 to the terminal 10 of another user, and receives voice data of another user from the terminal 10 of another user.

Note that one of the terminals 10 may not include the computation unit 13 and receive the calculation result of the computation unit 13 or data of the virtual space after applying the calculation result from another terminal 10. For example, when the terminal 10 on the left side of FIG. 2 (hereinafter referred to as terminal 10A) includes the computation unit 13 and the terminal 10 on the right side (hereinafter referred to as terminal 10B) does not include the computation unit 13, the terminal 10B receives data of the virtual space after applying the calculation result from the terminal 10A. At this time, for a user avatar B of a user B of the terminal 10B, the rendering unit 14 of the terminal 10B replaces a posture and position of the user avatar B to which the calculation result is applied with a posture and position of the user avatar B to which the calculation result is not applied, and renders the virtual space.

As long as the above functions can be implemented in the entire system, any device can be used to execute processing of each part included in the terminal 10. For example, a server (not illustrated) may include the VR space management unit 12 and the computation unit 13. The server receives control data of the avatar from each terminal 10. The VR space management unit 12 applies the control data to the avatar in the virtual space, and the computation unit 13 executes collision processing and applies the calculation result to the virtual space. Each terminal 10 receives data of the virtual space after applying the calculation result from the server. At this time, for a user avatar of a user using the terminal 10, the rendering unit 14 of each terminal 10 replaces a posture and position of the user avatar to which the calculation result is applied with a posture and position of the user avatar to which the calculation result is not applied, and renders the virtual space.

Further, the server may include the rendering unit 14. The server receives line-of-sight information of the user from each of the terminals 10A and 10B. The rendering unit 14 transmits a video obtained by rendering a virtual space in which the calculation result is not applied to the user avatar A to the terminal 10A, and provides a video obtained by rendering a virtual space in which the calculation result is not applied to the user avatar B to the terminal 10B. In this case, the terminals 10A and 10B may have a function of capturing motions of the users A and B and a function of displaying the received video.

Figure 3:
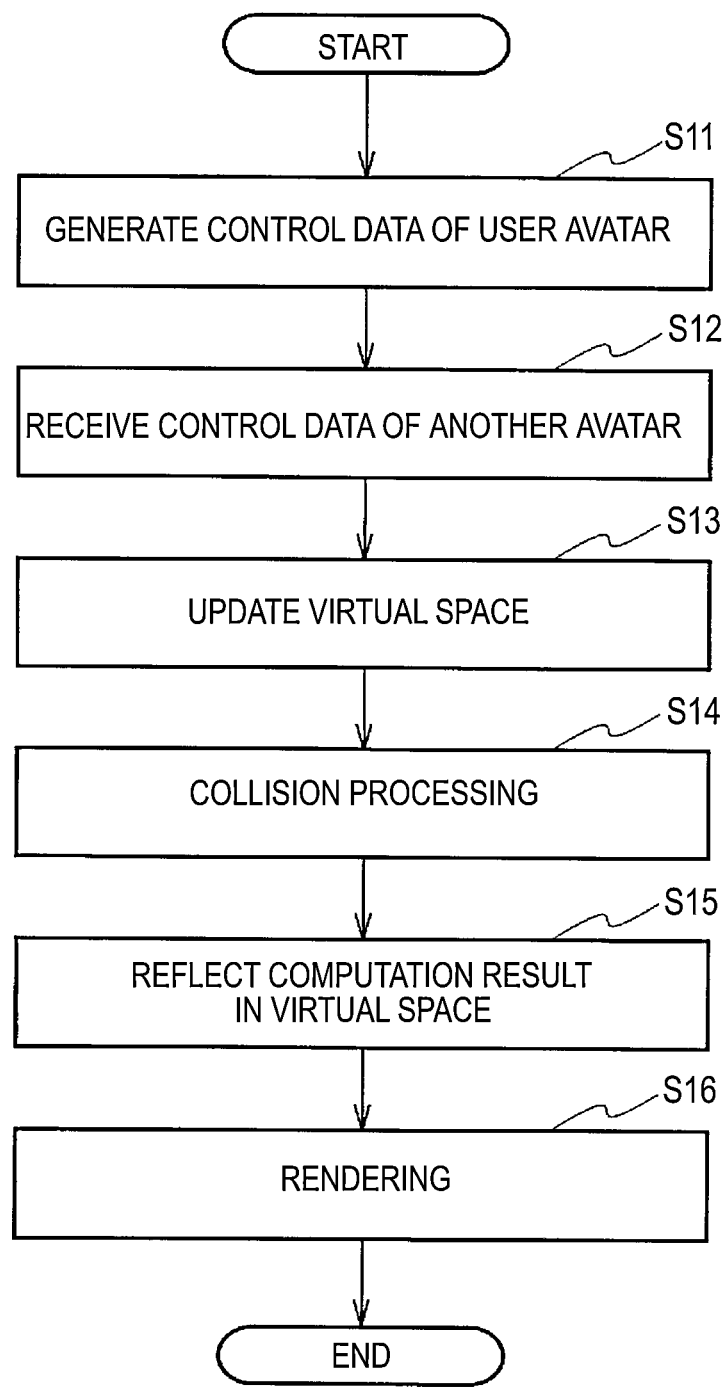
FIG. 3 is a flowchart illustrating a processing flow of the display control terminal of the first embodiment.

An operation of the terminal 10 will be described with reference to a flowchart of FIG. 3. Hereinafter, a case where the calculation result is not applied to the user avatar will be described. However, similar description can be applied to a case where the degree of application of the calculation result is suppressed or the calculation result calculated by changing a parameter is applied.

In step S11, the avatar control unit 11 receives information about the posture of the user, etc. from the controller 20 and generates control data of the user avatar. The communication unit 15 transmits the control data generated by the avatar control unit 11 to another terminal 10.

In step S12, the communication unit 15 receives control data of another user avatar from another terminal 10.

In step S13, the VR space management unit 12 applies the control data to the avatar and updates a posture and position of a moving object.

In step S14, the computation unit 13 performs collision processing between objects. For example, the computation unit 13 determines whether or not there is a colliding object, obtains information about a collision position, a collision direction, an overlapping depth, etc. for the colliding object, and calculates a behavior of each object in response to a collision based on information about mass, velocity, a coefficient of restitution, etc. of the object.

Figure 4:
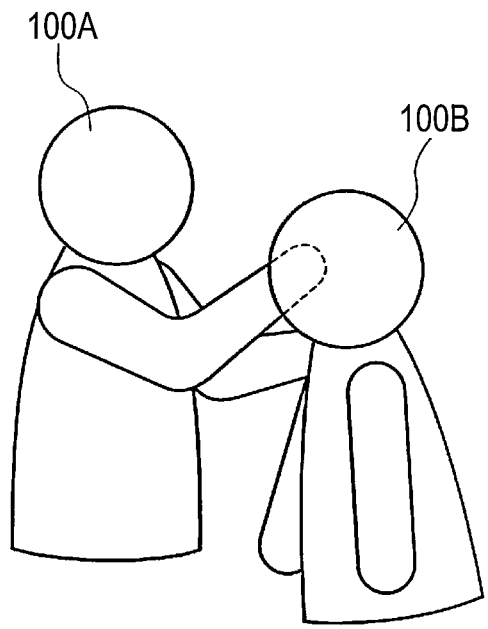
FIG. 4 is a diagram illustrating an example of an avatar when collision processing is not performed.

In step S15, the VR space management unit 12 reflects the calculation result of the computation unit 13 in the virtual space and updates the posture and position of the object. For example, when the avatar 100A hits a head of the avatar 100B, an arm of the avatar 100A and the head of the avatar 100B collide with each other as illustrated in FIG. 4. When the calculation result of the computation unit 13 is reflected in each of the avatars 100A and 100B, the arm of the avatar 100A and the head of the avatar 100B are not caved in illustrated in FIG. 5.

Note that the VR space management unit 12 separately manages the posture and position of the user avatar in a state where the calculation result is not applied. For example, the posture and position of the avatar 100A of FIG. 4 are separately managed. The VR space management unit 12 may separately manage the posture and position of the user avatar to which the calculation result having a changed degree of application is applied, or may separately manage the posture and position of the user avatar to which the calculation result calculated by changing the parameter is applied.

In step S16, the rendering unit 14 renders the virtual space without applying the calculation result to the user avatar, and supplies the rendered video to the HMD 30.

Figure 5:
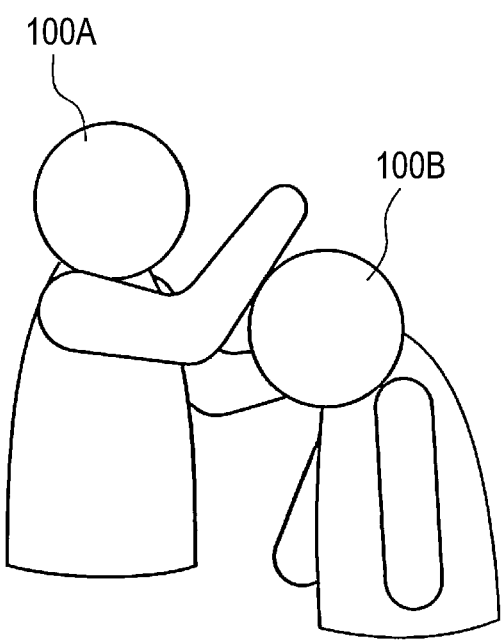
FIG. 5 is a diagram illustrating an example of an avatar when collision processing is performed.

For example, when the calculation result is applied to the avatar 100A, a position of the arm of the avatar 100A becomes a position illustrated in FIG. 5. However, since the user performs an operation to lower the arm of the avatar 100A to a position illustrated in FIG. 4, the operation of the user and the posture of the avatar 100A do not match, and the user feels uncomfortable.

Figure 6:
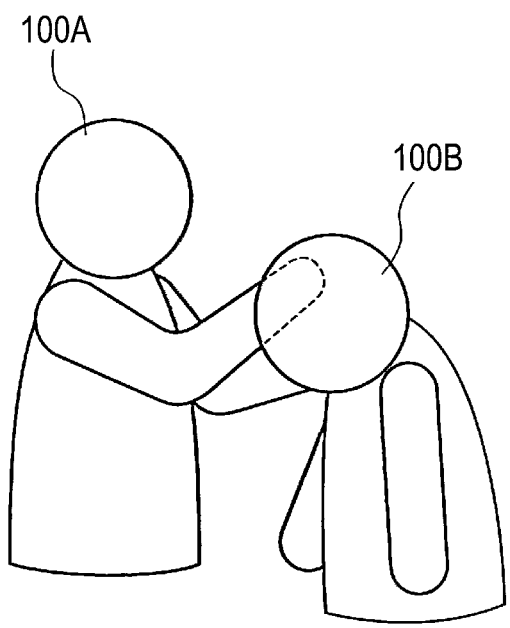
FIG. 6 is a diagram illustrating an example when collision processing is performed on only one avatar.
Figure 7:
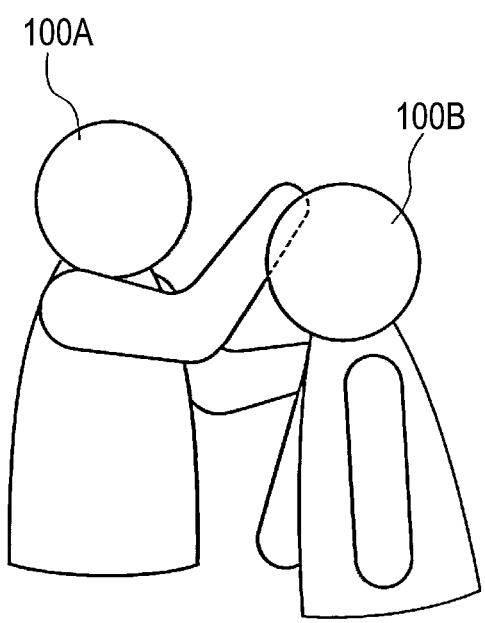
FIG. 7 is a diagram illustrating an example when collision processing is performed only on the other avatar.

Therefore, in the present embodiment, the posture and position of the user avatar to which the calculation result is not applied are managed, and the rendering unit 14 replaces the user avatar to which the calculation result is applied with the user avatar to which the calculation result is not applied, and renders the virtual space. For example, as illustrated in FIG. 6, a video in which the avatar 100A is replaced with the avatar 100A to which the calculation result is not applied (the avatar 100A of FIG. 4) and rendered is presented to a user who operates the avatar 100A. In FIG. 6, the calculation result is applied to the avatar 100B. On the other hand, as illustrated in FIG. 7, a video in which the avatar 100B is replaced with the avatar 100B to which the calculation result is not applied (the avatar 100B of FIG. 4) and rendered is presented to a user who operates the avatar 100B. In FIG. 7, the calculation result is applied to the avatar 100A. Note that a video obtained by rendering the avatars 100A and 100B, to which the calculation result is applied, as illustrated in FIG. 5 is presented to a user other than the users who operate the avatars 100A and 100B.

Figure 8:
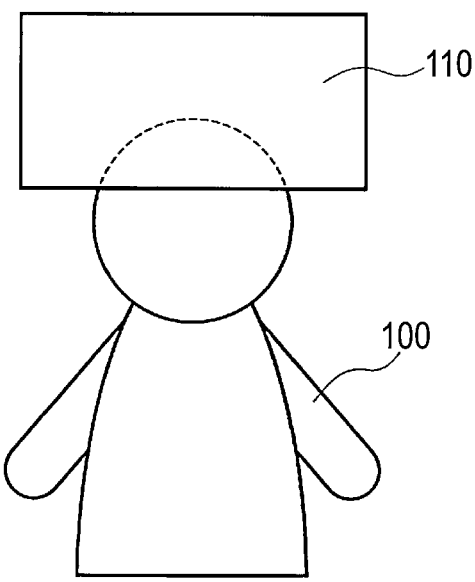
FIG. 8 is a diagram illustrating an example of an avatar when collision processing is not performed.
Figure 9:
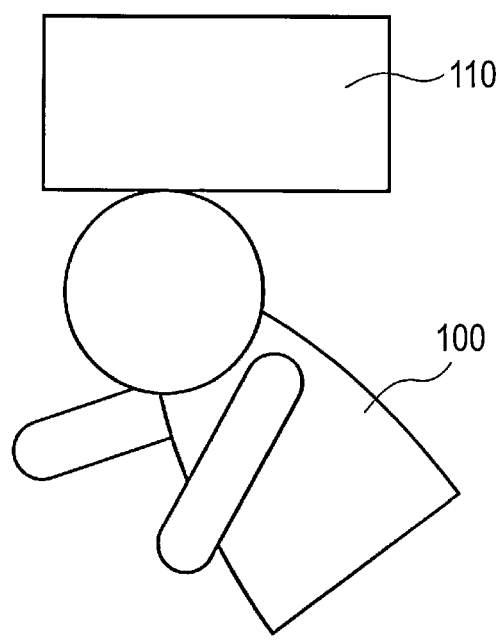
FIG. 9 is a diagram illustrating an example of an avatar when collision processing is performed.

Similar processing is performed on a collision between an avatar and a non-avatar object. For example, as illustrated in FIG. 8, it is assumed that an object 110 collides with the avatar 100. When the calculation result of the computation unit 13 is reflected in each of the avatar 100 and the object 110, the posture of the avatar 100 is greatly collapsed as illustrated in FIG. 9.

The user who operates the avatar 100 is provided with a video obtained by rendering the avatar 100 to which the calculation result is not applied as illustrated in FIG. 8. The other users are provided with a video obtained by rendering the avatar 100 to which the calculation result is applied as illustrated in FIG. 9.

As described above, according to the present embodiment, the computation unit 13 performs object collision processing to calculate the physical behavior of each object, the VR space management unit 12 applies the calculation result of the computation unit 13 to each object, and when the rendering unit 14 renders a video supplied to the HMD 30 worn by the user, the user avatar operated by the user is rendered so that the reaction motion of the user avatar is suppressed within a predetermined range. In this way, a user avatar that performs a reaction motion in response to a collision with an object can be presented to others other than the user, and a user avatar whose reaction motion is suppressed can be presented to the user. Therefore, it is possible to give reality to a collision of an object with the user avatar without making the user feel uncomfortable with the movement of the user avatar.

Second Embodiment

Hereinafter, a video distribution system including a display control terminal of a second embodiment will be described with reference to the drawings.

The video distribution system including the display control terminal of the second embodiment is a system in which a distributor operates a distributor avatar in the virtual space and distributes a video in the virtual space to a viewer. In addition to viewing the video, the viewer can have a viewer avatar operated by the viewer participate in the same virtual space as that of the distributor avatar.

Figure 10:
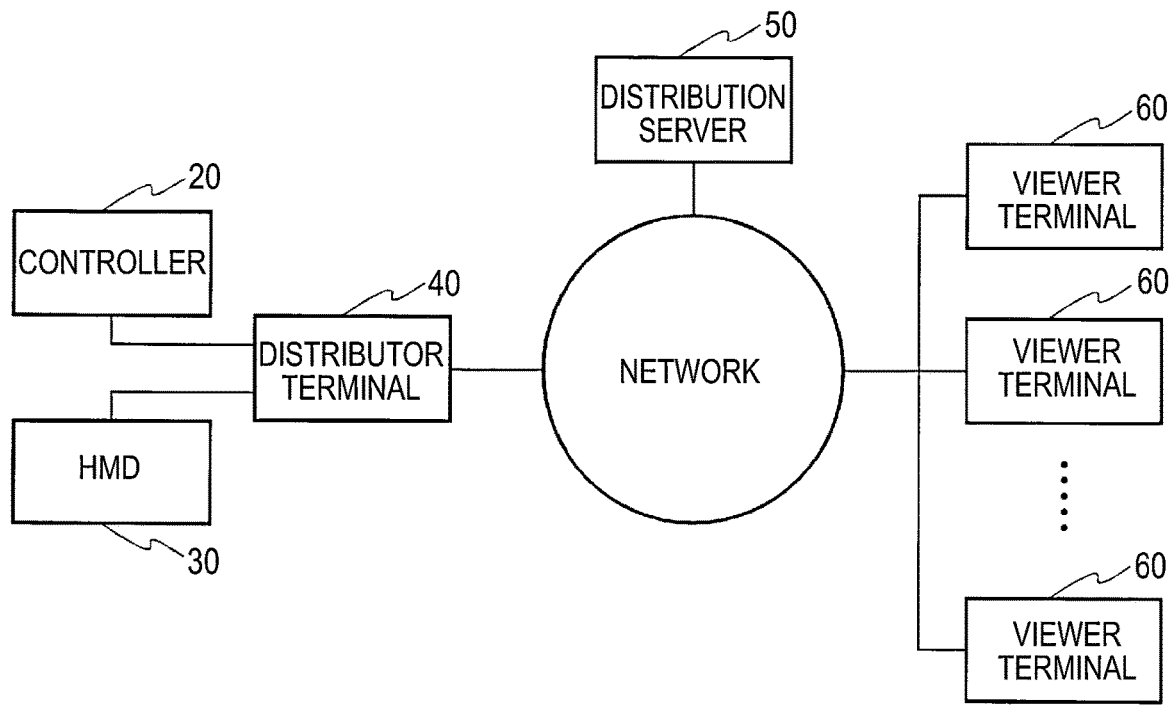
FIG. 10 is a diagram illustrating a configuration example of a video distribution system including a display control terminal of a second embodiment.

The video distribution system of FIG. 10 includes a distributor terminal 40, which is the display control terminal of the second embodiment, and a distribution server 50. The distributor terminal 40 and the distribution server 50 are communicably connected via a network.

The distribution server 50 receives a video obtained by rendering the virtual space from the distributor terminal 40, and distributes the received video to a viewer terminal 60. The distribution server 50 may perform live video distribution in which the received video is distributed in real time, or may store the received video and distribute the video in response to a request from the viewer terminal 60.

The viewer terminal 60 is a terminal for allowing the viewer to view the video. A device such as a mobile terminal or a personal computer can be used as the viewer terminal 60 as long as the device allows the delivered video to be viewed. The viewer terminal 60 may receive data of the virtual space and render the virtual space. In addition, when the viewer participates in the live video distribution, the viewer terminal 60 connects an HMD, a controller, etc., and uses a device having a VR function. For example, the terminal 10 of the first embodiment is used as the viewer terminal 60, and data in the virtual space is synchronized with the distributor terminal 40.

Figure 11:
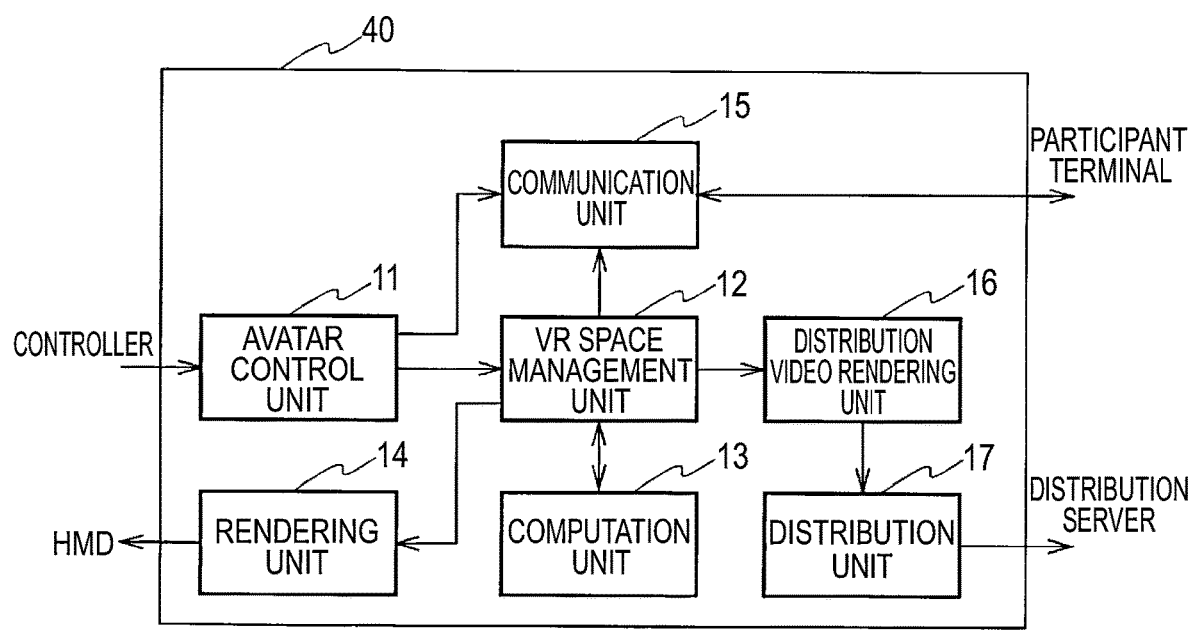
FIG. 11 is a functional block diagram illustrating a configuration example of the display control terminal of the second embodiment.

A configuration of the distributor terminal 40 will be described with reference to FIG. 11. The distributor terminal 40 includes an avatar control unit 11, a VR space management unit 12, a computation unit 13, a rendering unit 14, a communication unit 15, a distribution video rendering unit 16, and a distribution unit 17. The distributor terminal 40 includes the distribution video rendering unit that renders a video for distribution and the distribution unit 17 that distributes a video in the terminal 10 of the first embodiment.

The avatar control unit 11 receives the posture, position, and operation information of the distributor from a device such as the controller 20, and generates control data for controlling a posture and movement of the distributor avatar.

The VR space management unit 12 manages data of an object existing in the virtual space. The VR space management unit 12 applies the control data generated by the avatar control unit 11 to the distributor avatar to update the posture and position of the distributor avatar. When the viewer is participating, the VR space management unit 12 applies the control data received from the viewer terminal 60 of the participating viewer to model data of the viewer avatar.

When objects collide with each other in the virtual space, the computation unit 13 calculates physical behaviors of the objects in response to the collision. For the distributor avatar, the VR space management unit 12 manages posture and position information of the distributor avatar in a state where the calculation result is not applied in addition to posture and position information of the distributor avatar after applying the calculation result. Similarly to the first embodiment, the VR space management unit 12 may manage posture and position information of the distributor avatar in a state where a calculation result calculated by changing a parameter is applied, or manage posture and position information of the distributor avatar in a state where a calculation result is applied by changing a degree of application.

The rendering unit 14 renders the virtual space from a viewpoint of the distributor avatar without applying the calculation result to the distributor avatar, and supplies a rendered video to the HMD 30. Similarly to the first embodiment, the rendering unit 14 renders the distributor avatar so that a reaction motion of the distributor avatar is suppressed within a predetermined range.

The communication unit 15 transmits and receives control data and voice data of the avatar to and from the viewer terminal 60 of the participating viewer. Further, the communication unit 15 may receive a comment (character information) from the viewer terminal 60, or may receive information about a gift, an item, etc. The distributor terminal 40 may display an object displaying content of a comment in the virtual space for a comment received from the viewer terminal 60. The distributor terminal 40 may make an object corresponding to a gift or item received from the viewer terminal 60 appear in the virtual space. When an object corresponding to the comment, gift, and item collides with the distributor avatar, the distributor avatar performs a reaction motion based on a calculation result of the computation unit 13.

The distribution video rendering unit 16 renders a virtual space in which the calculation result of the computation unit 13 is applied to the distributor avatar, and generates a video for distribution. The distribution video rendering unit 16 may render the virtual space from a viewpoint of the distributor avatar, or may render the virtual space from a viewpoint of a virtual camera disposed in the virtual space. Voice data of the distributor and a participant may be added to the video for distribution.

The distribution unit 17 transmits the video for distribution rendered by the distribution video rendering unit 16 to the distribution server 50. The distribution server 50 distributes the received video to each of the viewer terminals 60.

Note that the distribution server 50 may include the distribution video rendering unit 16 and the distribution unit 17. In this case, the distribution server 50 holds data in the virtual space and synchronizes the data in the virtual space with the distributor terminal 40. The distribution server 50 renders the virtual space and distributes the virtual space to the viewer terminal 60. The distribution server 50 may include the VR space management unit 12 and the computation unit 13 to manage the data in the virtual space, and the distributor terminal 40 may acquire the data in the virtual space from the distribution server 50. The rendering unit 14 of the distributor terminal 40 replaces the distributor avatar with a distributor avatar to which the calculation result of the computation unit 13 is not applied, and renders the virtual space. The distribution server 50 may include the rendering unit 14 to render the video supplied to the HMD 30 of the distributor.

Figure 12:
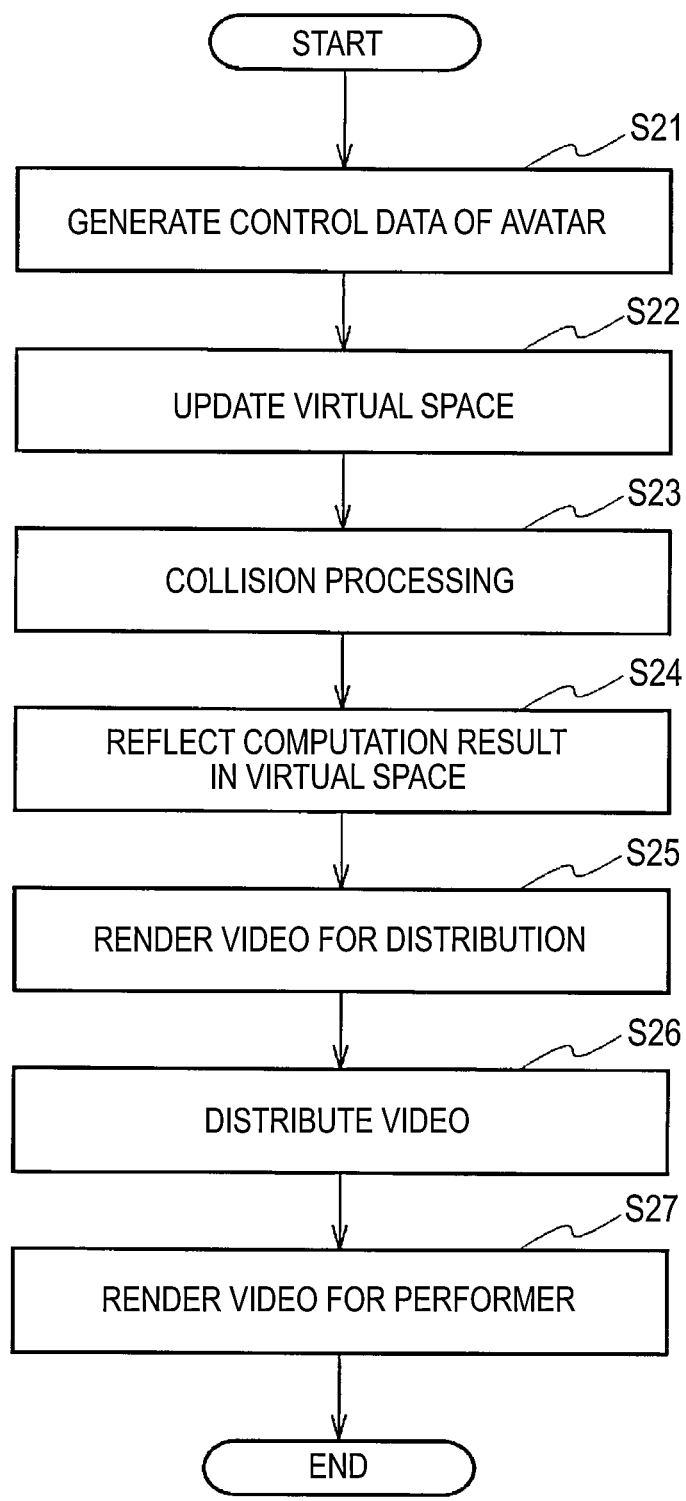
FIG. 12 is a flowchart illustrating a processing flow of the display control terminal of the second embodiment.

An operation of the distributor terminal 40 will be described with reference to a flowchart of FIG. 12. The case where the calculation result is not applied to the distributor avatar will be described below. However, the description is similarly applied to a case where a degree of application of the calculation result is suppressed or the calculation result calculated by changing a parameter is applied.

In step S21, the avatar control unit 11 receives information about the posture of the distributor, etc. from the controller 20 and generates control data of the distributor avatar. When the viewer is participating, the communication unit 15 transmits the control data generated by the avatar control unit 11 to the viewer terminal 60 of the participating viewer.

In step S22, the VR space management unit 12 applies the control data to the avatar and updates the posture and position of the moving object. Further, the VR space management unit 12 applies the control data received from the viewer terminal 60 of the participating viewers to the viewer avatar.

In step S23, the computation unit 13 performs collision processing between objects.

In step S24, the VR space management unit 12 reflects the calculation result of the computation unit 13 in the virtual space and updates the posture and position of the object. At this time, the VR space management unit 12 separately manages the posture and position of the distributor avatar in a state where the calculation result is not applied.

In step S25, the distribution video rendering unit 16 renders the virtual space to which the calculation result of the computation unit 13 is applied, and generates a distribution video. As illustrated in FIG. 9, for example, the distribution video rendering unit 16 renders a virtual space in which the calculation result is applied to the avatar.

In step S26, the distribution unit 17 transmits the distribution video.

In step S27, the rendering unit 14 renders the virtual space without applying the calculation result to the distributor avatar, and supplies the rendered video to the HMD 30. As illustrated in FIG. 8, for example, the rendering unit 14 renders the virtual space in which the calculation result is not applied to the avatar. That is, the rendering unit 14 renders the virtual space in which the distributor avatar is replaced with the avatar to which the calculation result is not applied.

Note that when the calculation result is not applied to the distributor avatar, the distributor may not be aware that the object collides with the distributor avatar. Therefore, the distributor terminal 40 may have a function of notifying the distributor of the collision between the distributor avatar and the object.

For example, the distributor terminal 40 notifies the distributor by sound when the distributor avatar and the object collide with each other. At the moment of impact when the distributor avatar and the object collide with each other, sound corresponding to the collision is heard by both the distributor and the viewer. While the distributor avatar and the object are in contact with each other, sound reporting contact is heard only by the distributor. As illustrated in FIGS. 8 and 9, when the object 110 collides with a head of the avatar 100, the sound effect of the object 110 colliding with the avatar 100 is heard by the distributor and the viewer at the moment of the collision. Thereafter, while the object 110 is on the head of the avatar 100, only the distributor continues to hear sound indicating that the object 110 is colliding with the avatar 100.

Alternatively, the distributor terminal 40 shows a video viewed by the viewer to the distributor. The distributor terminal 40 displays the video viewed by the viewer on a monitor in the virtual space. For example, the monitor is disposed in front of a line of sight of the distributor avatar.

Alternatively, the rendering unit 14 renders the user avatar to which the calculation result is applied, in addition to the user avatar whose reaction motion is suppressed within a predetermined range. At this time, the rendering unit 14 performs rendering by changing a display mode, such as making the user avatar to which the calculation result is applied semitransparent.

A configuration for reporting a collision between an avatar and an object may be applied to the first embodiment.

As described above, according to the present embodiment, the computation unit 13 performs object collision processing to calculate the physical behavior of each object, the VR space management unit 12 applies the calculation result of the computation unit 13 to each object, and when the rendering unit 14 renders a video supplied to the HMD 30 worn by the user, the distributor avatar operated by the distributor is rendered so that the reaction motion of the distributor avatar is suppressed within a predetermined range. In this way, a distributor avatar that performs a reaction motion in response to a collision with an object can be presented to the viewer, and a distributor avatar whose reaction motion is suppressed can be presented to the distributor. Therefore, it is possible to give reality to a collision of an object with the distributor avatar without making the distributor feel uncomfortable with the movement of the distributor avatar.

REFERENCE SIGNS LIST

10 Terminal
11 Avatar control unit
12 VR space management unit
13 Computation unit
14 Rendering unit
15 Communication unit
16 Distribution video rendering unit
17 Distribution unit
20 Controller
30 HMD
40 Distributor terminal
50 Distribution server
60 Viewer terminal

The invention claimed is:

1. A display control device for displaying a virtual space including an avatar operated by a user wearing a head-mounted display, the display control device comprising:
an avatar control unit for generating control data of the avatar according to movement of the user;

a computation unit for calculating physical behaviors of the avatar and an object according to a collision when the avatar and the object collide with each other;

a virtual space management unit for applying a calculation result of the computation unit to the virtual space; and a rendering unit for rendering the avatar whose behavior in response to the collision is suppressed within a predetermined range as a video supplied to the head-mounted display when a posture of the avatar to which the calculation result is applied and a posture of the avatar based on an operation of the user diverge from each other by a predetermined value or more.

2. The display control device according to claim 1, wherein the rendering unit renders the video in which a behavior of the avatar is suppressed within the predetermined range by not applying the calculation result to an avatar operation by the user, by changing a degree of application to apply the calculation result to the avatar operated by the user, or by applying another calculation result calculated by changing a parameter to the avatar operated by the user.

3. The display control device according to claim 1, further comprising
a notification unit for notifying the user that the avatar and the object have collided with each other.

4. The display control device according to claim 1, further comprising
a distribution unit for distributing a video obtained by rendering the virtual space to which the calculation result of the computation unit is applied.

5. A display control method executed by a display control device for displaying a virtual space including an avatar operated by a user wearing a head-mounted display, the display control method comprising:

generating control data of the avatar according to movement of the user;

calculating physical behaviors of the avatar and an object according to a collision when the avatar and the object collide with each other;

applying, to the virtual space, a calculation result obtained in the step of calculating; and rendering the avatar whose behavior in response to the collision is suppressed within a predetermined range as a video supplied to the head-mounted display when a posture of the avatar to which the calculation result is applied and a posture of the avatar based on an operation of the user diverge from each other by a predetermined value or more.

6. A display system including first and second display control devices used by first and second users, respectively, communication being performed in a virtual space through first and second avatars operated by the first and second users wearing head-mounted displays, respectively, in the display system, wherein the first display control device includes:
a first avatar control unit for generating control data of the first avatar according to movement of the first user; and
a first rendering unit for rendering the virtual space as a video supplied to the head-mounted display worn by the first user, wherein the second display control device includes:
a second avatar control unit for generating control data of the second avatar according to movement of the second user; and
a second rendering unit for rendering the virtual space as a video supplied to the head-mounted display worn by the second user, wherein at least one of the first display control device and the second display control device includes a computation unit for calculating physical behaviors of an avatar and an object according to a collision when the avatar and the object collide with each other, wherein a calculation result of the computation unit is applied to the virtual space and is synchronized between the first and second display control devices, wherein the first rendering unit renders the first avatar whose behavior in response to a first collision is suppressed within a predetermined range when a posture of the first avatar to which the calculation result is applied and a posture of the first avatar based on an operation of the first user diverge from each other by a first predetermined value or more, and wherein the second rendering unit renders the second avatar whose behavior in response to a second collision is suppressed within a predetermined range when a posture of the second avatar to which the calculation result is applied and a posture of the second avatar based on an operation of the second user diverge from each other by a second predetermined value or more.

* * * * *